United States Patent [19]
Grove

[11] Patent Number: 5,341,266
[45] Date of Patent: Aug. 23, 1994

[54] PROTECTIVE DEVICE IN ELECTRICALLY-POWERED APPARATUS AND EQUIPMENT

[75] Inventor: Manfred Grove, Dreieich, Fed. Rep. of Germany

[73] Assignee: Intermacom A.G., Zuerich, Switzerland

[21] Appl. No.: 46,500

[22] Filed: Apr. 12, 1993

Related U.S. Application Data

[63] Continuation of Ser. No. 621,342, Dec. 3, 1990, abandoned.

[51] Int. Cl.⁵ .............................................. H02H 3/16
[52] U.S. Cl. ........................................ 361/45; 361/50; 361/49; 307/326
[58] Field of Search ................ 361/50, 49, 45, 87, 361/42, 104; 307/326

[56] References Cited

U.S. PATENT DOCUMENTS

| | | | |
|---|---|---|---|
| 2,863,021 | 12/1958 | Green | 200/114 |
| 3,407,840 | 10/1968 | Finnegan | 137/392 |
| 3,525,902 | 8/1970 | Davidson et al. | 317/9 |
| 3,535,590 | 10/1970 | Mayer | 361/45 |
| 3,629,766 | 12/1971 | Gould, Jr. | 337/239 |
| 3,728,583 | 4/1973 | Wickson | 317/33 SC |
| 3,770,002 | 11/1973 | Brown | 137/312 |
| 3,875,431 | 4/1975 | Kapp | 307/298 |
| 3,948,143 | 4/1976 | Olsen | 89/1 B |
| 3,997,818 | 12/1976 | Bodkin | 317/33 |
| 4,023,072 | 5/1977 | Plasko | 361/50 |
| 4,044,244 | 8/1977 | Foreman et al. | 235/153 |
| 4,085,397 | 4/1978 | Yagher, Jr. | 337/407 |
| 4,103,319 | 7/1978 | Crain et al. | 361/106 |
| 4,112,312 | 9/1978 | McGalliard | 307/118 |
| 4,124,835 | 11/1978 | Cahill, Jr. | 337/1 |
| 4,263,576 | 4/1981 | Murata et al. | 338/35 |
| 4,270,158 | 5/1981 | Gilardoni et al. | 361/42 |
| 4,328,387 | 5/1982 | Kemble | 219/517 |
| 4,438,477 | 3/1984 | Cawley | 361/119 |
| 4,464,582 | 8/1984 | Aragaki | 307/118 |
| 4,477,857 | 10/1984 | Crocker | 361/119 |
| 4,484,243 | 11/1984 | Herbst et al. | 361/50 |
| 4,567,456 | 1/1986 | Legatti | 335/20 |
| 4,589,047 | 5/1986 | Gaus et al. | 361/42 |
| 4,685,021 | 8/1987 | Kortschinski et al. | 361/42 |
| 4,709,293 | 11/1987 | Gershen et al. | 361/50 |
| 4,751,603 | 6/1988 | Kwan | 361/42 |
| 4,829,390 | 5/1989 | Simon | 361/49 |
| 4,931,894 | 6/1990 | Legatti | 361/45 |
| 5,019,935 | 5/1991 | Nakamura | 361/45 |
| 5,115,367 | 5/1992 | Gaus et al. | 361/49 |

FOREIGN PATENT DOCUMENTS

| | | | |
|---|---|---|---|
| 0001831 | 5/1979 | European Pat. Off. | H02H 5/00 |
| 0088390 | 3/1983 | European Pat. Off. | H01H 35/42 |
| 0218847 | 4/1987 | European Pat. Off. | H02H 5/00 |
| 2220264 | 11/1972 | Fed. Rep. of Germany | H01H 37/76 |
| 3702970 | 8/1988 | Fed. Rep. of Germany | H02H 5/12 |
| 3826462 | 2/1990 | Fed. Rep. of Germany | H02H 5/12 |
| 8700226 | 11/1987 | PCT Int'l Appl. | H02H 5/08 |

Primary Examiner—Todd DeBoer
Attorney, Agent, or Firm—Kenyon & Kenyon

[57] ABSTRACT

A protective device for an externally powered electrical apparatus is disclosed. The protective device is designed to prevent accidental electrocution of the user if the power supply is subject to a short circuit. The protective device is an electromechanical device incorporating a device for detecting current differentials between non-ground electrical conductors, a normally closed switch in association with a fuse device, and a trigger circuit for terminating the current flow through the electrical apparatus when a short circuit is detected.

15 Claims, 3 Drawing Sheets

PROTECTIVE DEVICE IN ELECTRICALLY-POWERED APPARATUS AND EQUIPMENT

This is a continuation of application Ser. No. 07/621,342 filed on Dec. 3, 1990 now abandoned.

BACKGROUND OF THE INVENTION

The present invention relates to a protective device for electrically-powered apparatus and equipment to prevent accidental electrocution of a user. Such a protective device is especially suitable for portable equipment powered by a power line through a power cord connection.

There have been many attempts in the prior art to produce a device which will prevent accidental electrocution. These devices work in a number of ways. Some operate by quickly detecting and reacting to a resultant overload. Others react to a short between a supply conductor and an external ground. Another type of device detects a short occurring in the load where a person may be connected between the shorted load and ground. Finally, there have also been many attempts to provide overload and/or over-voltage protection for circuits.

There are two types of prior art devices of particular interest in relation to the present invention. First, there is the Immersion Detection Circuit Interrupter ("IDCI"). Second, there is the Ground Fault Circuit Interrupter ("GFCI"). Both of these types of devices can be physically located in either the power outlet, in the plug, or in the apparatus itself.

IDCI's require a moisture sensor incorporated into the apparatus itself. The moisture sensor is typically in the form of metallic wires or conductors which will contact any water or other electrically conductive fluid which is introduced into the apparatus. The apparatus is typically used in damp areas such as the bathroom. The apparatus includes such things as immersion pumps, air bubble massage equipment, kitchen equipment, hair dryers, forced air heaters, etc.

The voltage-carrying parts and sensors in the IDCI's must be carefully installed and mechanically secured to avoid movement during normal operation and during shock loading conditions. In order to comply with the applicable safety regulations (UL-1664), prior to bringing a new product to market, a major design and engineering effort is required. Further, the design of such equipment is complicated by the fact that a sensor must be placed at or near every opening in the equipment.

The process for obtaining UL certification for equipment incorporating IDCI's is time consuming and expensive. Each particular equipment design must be tested by immersion in water and then, subsequently, the dried equipment is tested.

Another complication with the IDCI devices such as those disclosed in U.S. Pat. No. 4,589,047 is that the IDCI itself must be liquid-tight in order to prevent leakage of electrical power out of the submersed equipment. If the IDCI is not liquid tight, electricity would leak into the surrounding fluid when the appliance is accidentally submersed. Such liquid-tight devices are technically complicated to design and costly to produce.

German Patent DP 3702970 discloses an IDCI device located in the equipment plug. This type of device requires a three-wire cable. One of the wires is a shield wire, preferably of the wire-mesh type, wrapped around the other two wires and connected to the equipment sensors. UL-approved, flexible, shielded cables of this type are not currently produced in large quantities and thus the cost is prohibitively high.

UL-1664 requires that an IDCI device act to shut off the power supply within 3 AC half cycles or 25 milliseconds. However, the IDCI disclosed in U.S. Pat. No. 4,589,047 operates only during half of the AC current cycle. Thus, only one active half cycle or 8.33 milliseconds would be available to melt the fuse wire of the protective device. In order to achieve melting of the fuse wire in such a short time interval, a wire of 0.04 mm is required. Such a small fuse wire is extremely difficult to handle during manufacture. In addition, it has a very low tensile strength of the order of 120 grams and thus is susceptible to rupture resulting from mechanical shocks.

IDCI devices are also susceptible to trigger circuit malfunctions caused by interference from the power supply system. It is difficult and expensive to protect against this problem, further adding to the difficulties in engineering and manufacturing these devices.

GFCI devices contain either a mechanically-locked switch which can be magnetically unlocked or a magnetically-locked switch that can be unlocked by switching off the current to a magnetic spool. In either type of device, unlocking the switch results in shutting off the power supply.

U.S. Pat. No. 4,567,456 discloses a GFCI-type device wherein the switch is magnetically locked. This device suffers from the disadvantage that it requires a relatively high standby current consumption in order to keep the contacts normally closed. In addition, this device cannot operate at different voltages such as 120 V/220 V required for travel appliances. The magnetic locking spool required for 120 V operation will produce excessive heat when used at 220 V.

A major disadvantage of GFCI devices is the large number of electromagnetic and mechanical parts contained therein. Thus, GFCI devices are very expensive for installation in low-cost apparatus such as household equipment. In addition, the reliability of GFCI devices is limited by the number of moveable parts required and the periodic reset function tests.

GFCI type devices may be resettable so that after the GFCI trips, the user may reset and reuse the device.

SUMMARY OF THE INVENTION

The object of the present invention is to provide a protective device for electrical equipment which overcomes the disadvantages of the existing prior art safety devices through a simpler more reliable, improved and cost effective device.

The present invention provides a GFCI-type device which can be utilized for accident-triggered use and cannot be re-set by the user. The present invention provides increased sensitivity over prior art devices. The present invention also provides a device which is subject to less accidental tripping than prior art devices. The present invention does not require any sensors in the equipment or any special cable. The present invention can be manufactured in a cost-effective manner since the number of electronic and mechanical parts have been reduced compared to the prior art. Finally, the present invention is more reliable than conventional GFCI-type devices because the smaller number of parts avoids the need for periodic functional tests.

The present invention, by consuming low standby current, provides a device which can operate at 120 V or 220 V and either 50 or 60 cps.

DETAILED DESCRIPTION OF THE INVENTION

Figure 1:
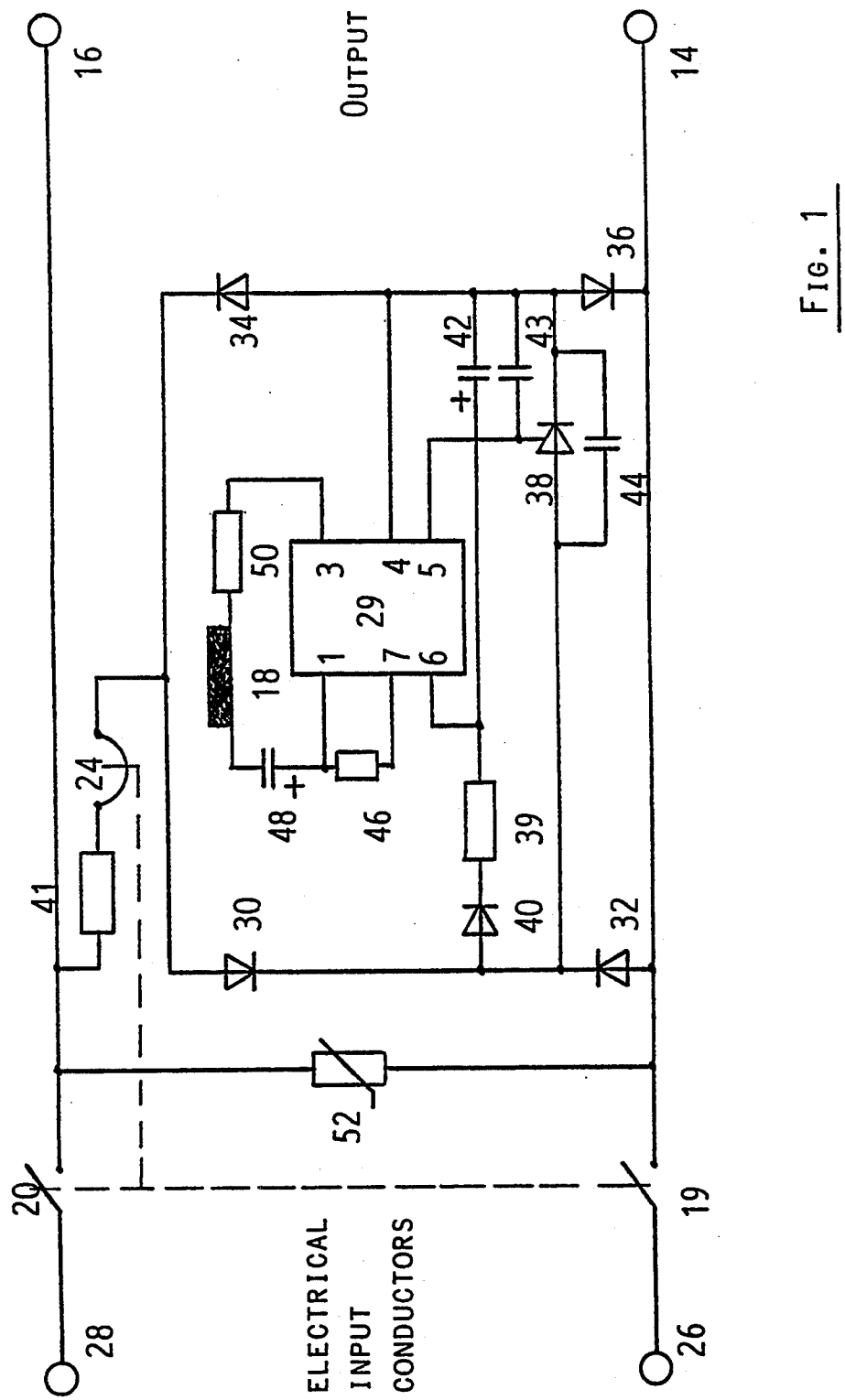
FIG. 1 is a schematic drawing of an electronic circuit exemplary of the present invention.
Figure 2:
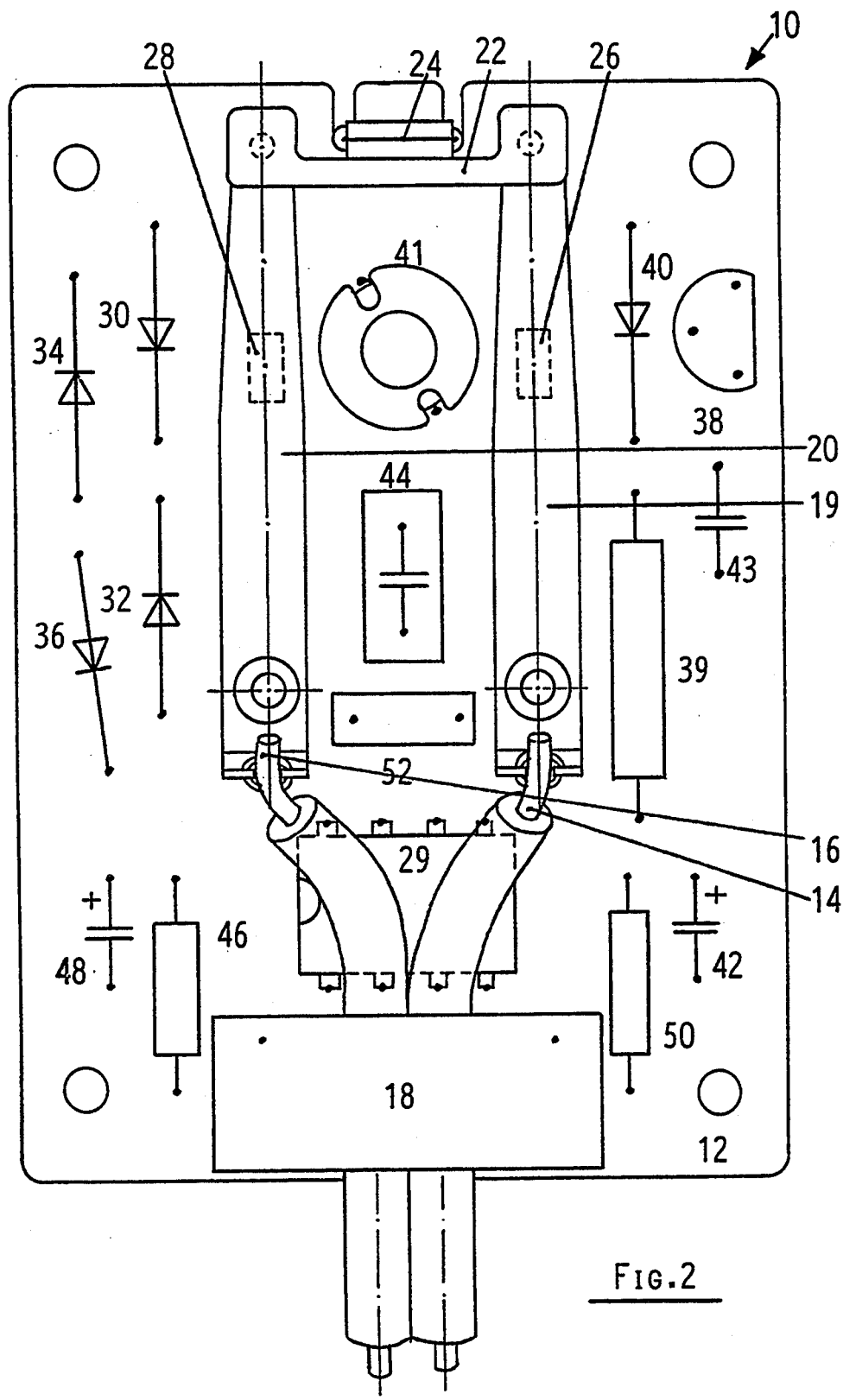
FIG. 2 illustrates a mechanical layout of a printed circuit board containing the components of the present invention.

FIG. 1 shows the circuit diagram for a protective device 10 in accordance with the present invention. The components of the device are mounted on a printed circuit board 12. The conductors of an electrical connection 14 and 16 pass through the ring shaped core of differential transformer 18. The transformer is a TRC standard coil 1000:1 type. The wires 14 and 16 are then soldered to the spring contacts 19 and 20. The spring contacts are connected by a plastic yoke 22. The contacts normally rest on top of plug pins 26 and 28 which connect to the electrical source line. The plug pins 26 and 28 are injection molded into the electrical input plug housing 56 and each protrude through the printed circuit board 12. The contacts are kept in the closed position by wire 24 which is wrapped over plastic yoke 22. During normal operation, line current does not flow to wire 24.

Neither the spring contacts 19 and 20 nor the top of the plug pins 26 and 28 require any reinforcement at the contact surface. However, these surfaces should be plated with a layer of corrosion resistant material. Nickel, tin, or silver are all acceptable corrosion resistant materials.

The electronic circuit illustrated in FIG. 1 incorporates integrated circuit ("IC") 29 and is a standard circuit used for integrated circuits in GFCI type devices. The circuit in FIG. 1 is used in conjunction with a Raytheon Corporation Model No. RV4145N IC. However, the circuit can be easily adapted by those skilled in the art to utilize other types of IC's such as a National Semiconductor Model No. LM1851. A DC current is generated from diodes 30, 32, 34 and 36. The circuit also incorporates a silicon-controlled rectifier ("SCR"), 38, such as type MCR 100-8 manufactured by Motorola. The IC and SCR are connected to the DC current through resistor 39 (56 k/0.5 W, 10%) and diode 40. All diodes herein are general purpose type 1N4004.

The differential transformer 18 acts to sense any differential current in electrical conductors 14 and 16. A differential current is indicative of a "hot" wire being connected to ground (i.e. through a conductive liquid such as water).

When a differential current is sensed, the IC 29 will cause the SCR 38 to "fire". Firing of the SCR results in DC current flowing through the fuse wire 24 causing it to melt and be destroyed. When fuse wire 24 is destroyed, the spring contacts 19 and 20 are released from their normally closed position. When the contacts are released, loss of power to the apparatus results.

Figure 3:
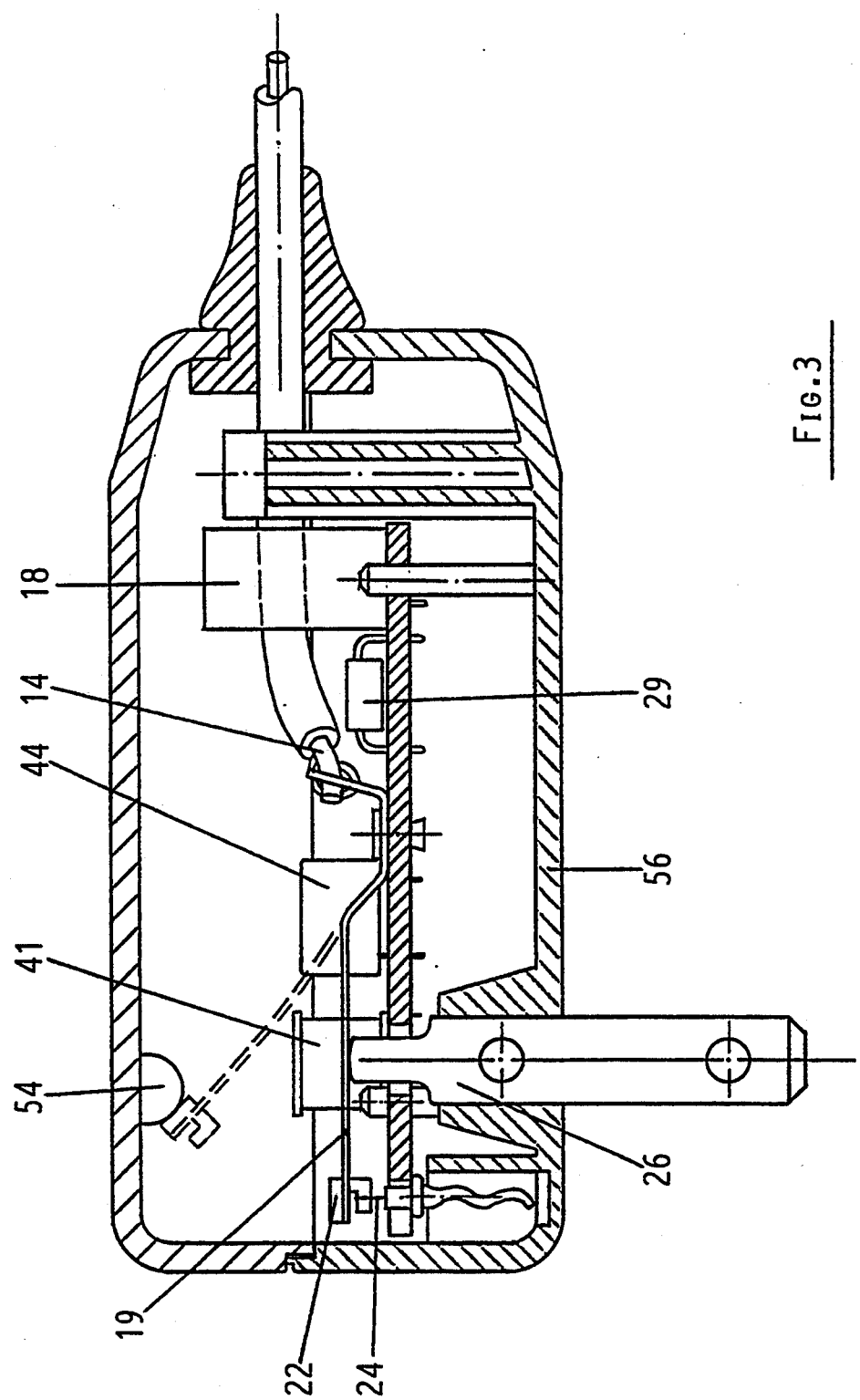
FIG. 3 is a cross-section of an equipment plug including the components of the present invention.

As illustrated in FIG. 3, a mechanical stopper 54 is placed on the top of the plug housing. After the spring contacts 19 and 20 are released, this stopper prevents the spring contacts 19 and 20 from swinging back and forth. The stopper thus prevents periodic opening and closing of the power supply after the circuit is triggered.

In the device of the present invention, both half cycles of the AC current are utilized. Thus, a relatively thick fuse wire of the order of 0.04 to 0.1 mm may be used. However, it is preferred to use a fuse wire with a diameter of 0.1 mm. The fuse wire may be selected from a number of suitable alloys having a high tensile strength combined with high electrical resistance. For example, NiCr20Al.Si with a tensile strength of approximately 780 grams and a resistance of approximately 165 ohms is suitable. A fusewire with this tensile strength should prevent the device from erroneously triggering due to accidental impact or shock. Suitable fuse wire is available from Isabellenhutte, Dillenburg, Germany under the tradename Isaohm.

Resistor 41 (19 ohms, 0.2 mm with CuNi 44, tradename Isotan, on a bobbin) acts to limit the ampere value to which the SCR 38 can be subjected. In the device illustrated in FIG. 1, the current through the SCR 38 should be limited to 6 amps. Capacitor 42 (1 MF/35 V) and Diode 40 protect the IC 29 from losing the supplied voltage and/or from functioning at the moment when the circuit is triggered. Capacitor 43 (0.1 MF/32 V) protects the circuit from any sort of impulse. Capacitor 44 (0.068 MF/200 V) protects the SCR 38 from interferences caused by the power supply grid. The resistive value chosen for Resistor 46 (1 M/0.25 W, 2%) can be varied to obtain the required sensitivity for triggering the device. Capacitor 48 (33 MF/6 V) prevents the offset voltage in the IC 29 from causing a DC current in transformer 18. Resistor 50 (100 ohms/0.25 W, 2%) acts to dampen the resonance of 48 with 18. Varistor 52 (VE07 M00151K) protects the circuit from excessively high voltages in the power supply grid.

In order to adapt the protective device for performance at either 50 or 60 cps and over a voltage range between 110 volts and 240 volts, some of the components need to be altered. In order to obtain performance over these ranges, the following components should be adapted as follows:

Capacitor 44—0.068 MF/400 V

Varistor 52—VD07 M00251

SCR 38—TAG X0203NA

Diodes 30, 32, 34, 36—1N 4007

Due to the small size of these parts and the small number of components in the electronic circuit, it is possible to build the entire protective device into a unit which is unitary with the power cord.

What is claimed is:

1. A protective device for an externally powered electrical apparatus comprising:
   a) a plug pin for coupling to an electrical power source;
   b) a plurality of non-ground electrical conductors for carrying electrical power from the plug pin and the externally powered electrical apparatus;
   c) a detector detecting a selected current differential between said plurality of non-ground electrical conductors;
   d) a switch being electrically coupled in series between the plug pin and one or more of the plurality of non-ground electrical conductors, the switch having the plug pin as a first contact and having a second contact electrically coupled to one or more of the non-ground electrical conductors, the first and second contacts being normally electrically closed;

e) a fuse operatively coupled to the switch, for maintaining the first and second contacts in the normally electrically closed position; and f) a trigger, electrically coupled to the detector and the fuse, for causing sufficient current to flow to the fuse in response to detection of the selected current differential by the detector so that the first and second contacts will open and current flow to the externally powered electrical apparatus will be terminated, wherein the protective device is contained in an electrical input plug housing of the externally powered electrical apparatus, and the switch comprises a spring contact which rests on the plug pin when the first and second contacts are electrically closed.

2. The protective device according to claim 1, wherein the detector comprises a transformer including a hollow core through which the plurality of non-ground electrical conductors pass.

3. The protective device according to claim 1, wherein the fuse comprises an electrically conductive wire.

4. The protective device according to claim 4, wherein the electrically conductive wire is made of an $NiCr_2OAl-Si$ alloy having a diameter of about 0.1 mm, a tensile strength of about 780 grams and an electrical resistance of about 165 ohms.

5. The protective device according to claim 1, wherein the trigger comprises a circuit including a semiconductor switch having a first terminal, a second terminal, and a gate input, the gate input being excited only upon detection of the selected current differential by the detecting, the semiconductor switch being electrically conductive between the first terminal and the second terminal only upon excitation of the gate input so that detection of the selected current differential causes the gate input excitation which causes the semiconductor switch to conduct between the first and second terminals thereby causing the sufficient current to flow to the fuse.

6. The protective device according to claim 1, wherein the switch comprises a two-pole switch.

7. The protective device according to claim 1, wherein the plug pin is injection molded in the electrical input plug housing.

8. The protective device according to claim 1, wherein the electrical input plug housing further comprises a mechanical stopper to prevent periodic opening and closing of the first and second contacts after the trigger causes the sufficient current to flow to the fuse.

9. The protective device for an externally powered electrical apparatus having a plurality of non-ground electrical conductors fir coupling the device to a power source, said device comprising:

a) a plug pin for coupling to the source line connection;

b) a hollow core transformer for detecting a selected current differential between the plurality of non-ground electrical conductors passing therethrough which carry electrical power from a source line connection to the externally powered electrical apparatus;

c) a switch coupled electrically in series between the plug pin and one or more of the plurality of non-ground electrical conductors, the switch having the plug pin as a first contact and having a second contact electrically coupled to one or more of the plurality of non-ground electrical conductors, the first and second contacts being normally electrically closed;

d) a fuse operatively coupled to the switch, for maintaining the first and second contacts in the normally closed position; and e) a trigger circuit, electrically coupled to the hollow core transformer and to the fuse, comprising a semiconductor switch, the semiconductor switch having a first terminal, a second terminal, and a gate input, the gate input being excited only upon a detection of the selected current differential by the hollow core transformer, the semiconductor switch being electrically conductive between the first terminal and the second terminal only upon the gate input excitation, so that detection of the selected current differential causes the gate input excitation, which causes the semiconductor switch to conduct between the first and second terminals thereby causing sufficient current to flow to the fuse so that the first and second contacts will open and current flow to the electrical externally powered apparatus will be terminated;

wherein the protective device is contained in an electrical input plug housing of the externally powered electrical apparatus, and the switch comprises a spring contact which rests on the plug pin when the first and second contacts are electrically closed.

10. The protective device as defined in claim 9, wherein the fuse comprises an electrically conductive wire.

11. The protective device as defined in claim 10, wherein the electrically conductive wire is made of an $NiCr_2OAl-Si$ alloy having a diameter of about 0.1 mm, a tensile strength of about 780 grams and an electrical resistance of about 165 ohms.

12. The protective device as defined in claim 9, wherein the switch and the trigger circuit are mounted on a circuit board.

13. The protective device as defined in claim 9, wherein the switch is a two-pole switch.

14. The protective device as defined in claim 9, wherein the plug pin is injection molded in the electrical input plug housing.

15. The protective device as defined in claim 9, wherein the electrical input plug housing further comprises a mechanical stopper to prevent periodic opening and closing of the first and second contacts after the trigger circuit causes the sufficient current to flow to the fuse.

* * * * *

UNITED STATES PATENT AND TRADEMARK OFFICE
CERTIFICATE OF CORRECTION

PATENT NO. : 5,341,266
DATED : August 23, 1994
INVENTOR(S) : Manfred Grove

It is certified that error appears in the above-indentified patent and that said Letters Patent is hereby corrected as shown below:

Column 3, line 28, change "portrude" to --protrudes--.
Column 5, line 25, change "claim 4" to --claim 3--.
Column 5, line 35, change "detecting" to --detector--.
Column 5, line 41, before "sufficient" delete "the"--.
Column 5, line 52, before "sufficient" delete "the"--.
Column 5, line 53, after "9." change " The" to --A--.
Column 5, line 55, change "fir" to --for--.
Column 6, line 20, after "upon" delete "a"--.
Column 6, line 58, before "sufficient" delete "the".

Signed and Sealed this

Fourth Day of April, 1995

Attest:

BRUCE LEHMAN

*Attesting Officer*     *Commissioner of Patents and Trademarks*